United States Patent [19]

Bodén et al.

[11] 4,309,642
[45] Jan. 5, 1982

[54] DEVICE FOR FEEDING A WIRE ELECTRODE

[75] Inventors: Knut F. I. Bodén; Christian J. Henningsen; Arvo Köster, all of Laxa, Sweden

[73] Assignee: ESAB Aktiebolag, Sweden

[21] Appl. No.: 6,249

[22] Filed: Jan. 24, 1979

[30] Foreign Application Priority Data

Jan. 27, 1978 [SE] Sweden .............................. 7801012

[51] Int. Cl.³ ............................................. H02P 1/54
[52] U.S. Cl. .................................. 318/113; 318/111; 318/86; 318/53; 318/49
[58] Field of Search ................ 226/108, 112; 318/113, 318/111, 86, 53, 49, 39

[56] References Cited

U.S. PATENT DOCUMENTS

| | | | |
|---|---|---|---|
| 2,310,098 | 2/1943 | Lessmann | 318/113 X |
| 3,156,397 | 11/1964 | Davies | 226/108 X |
| 3,586,221 | 6/1971 | Rosen | 226/108 X |
| 3,630,425 | 12/1971 | Wilkens | 226/108 |
| 3,672,655 | 6/1972 | Carter | 226/108 |
| 3,679,864 | 7/1972 | Tanegashima et al. | 226/108 X |
| 3,693,858 | 9/1972 | Araya et al. | 226/108 |
| 3,716,177 | 2/1973 | Leavitt | 226/108 X |

*Primary Examiner*—Ulysses Weldon
*Attorney, Agent, or Firm*—Lerner, David, Littenberg & Samuel

[57] ABSTRACT

Device for feeding a consumable wire electrode. Two feeding units are mounted in tandem. Each of the feeding units is provided with a pair of rolls and coupled to a direct current motor driving one of the rolls in the pair. The two motors are connected in series.

7 Claims, 1 Drawing Figure

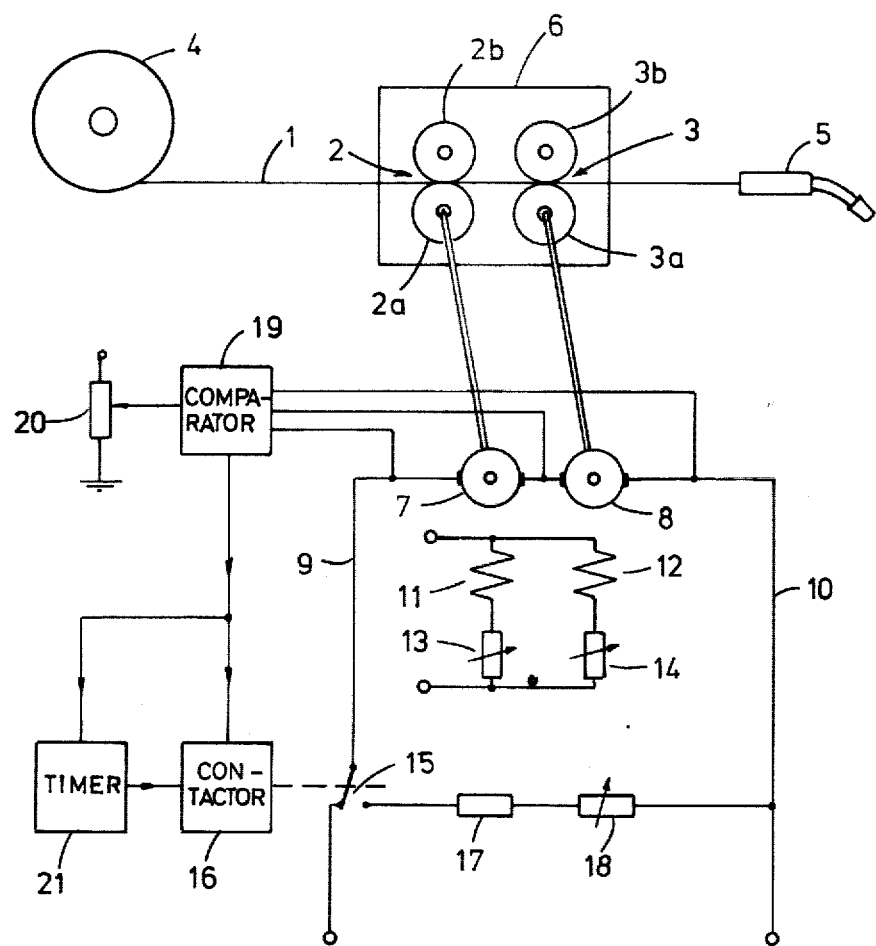

DEVICE FOR FEEDING A WIRE ELECTRODE

BACKGROUND OF THE INVENTION

This invention relates to a device for feeding a consumable wire electrode. The device is provided with two feeding units mounted in tandem, each of the feeding units having a pair of rolls. At least one of the rolls of each pair is a driven one.

Known devices of this kind are provided with feeding units mounted very close one behind the other and driven by the same motor. The motor is coupled to the rolls by gears having such a transmission ratio that the rolls rotate with the same speed. It is necessary that the circumferential speed of the rolls is equal in order to avoid stretching or bunching of the wire between the two feeding units. Therefore the diameter of the driving rolls must be exactly the same.

Other known devices have feeding units driven by individual motors. The speed characteristic of each motor is controlled individually for adjusting the pulling force transferred to the electrode. This requires control circuits for matching the speed characteristics of the motors.

SUMMARY OF THE INVENTION

In its broadest form the invention comprises a device for feeding a consumable wire electrode comprising two feeding units arranged in tandem, each of the two feeding units including a pair of rolls, a direct current motor driving one of the rolls of the pair, and means for connecting the armatures of said motors in series with each other to a supply voltage. During operation the motors will automatically rotate with a speed corresponding to the circumferential speed of the electrode feeding rolls. The total pulling force exerted on the electrode is distributed between the motors in a proportion depending on their respective torque-speed characteristics. While the loads taken by the motors are not quite equal, as their load characteristics are generally not exactly identical, special circuits for speed control are not required.

In a preferred embodiment of the invention, the speed characteristic of each of the motors droops not more than 20%, and preferably not more than 5% between no-load and full load.

The invention also includes an embodiment which includes means for comparing the armature voltage of each of the two motors with a predetermined voltage, said comparing means being arranged to generate a signal when the deviation of the armature voltage of any motor from the predetermined voltage is greater than a given value, a switch in the armature circuit of the motors, and means controlled by said signal for causing said switch to disconnect the armature circuit from the supply voltage.

According to a further feature within the invention, said switch is a change-over switch arranged in one position to connect the series connected motor armatures to the supply voltage and in the other position to connect the armatures in a braking circuit including a brake resistor.

BRIEF DESCRIPTION OF THE DRAWINGS

The invention will be more readily understood with reference to the accompanying drawing which shows an embodiment of the invention. The single FIGURE shows somewhat schematically a feeding device together with a connection diagram.

DESCRIPTION OF THE PREFERRED EMBODIMENT

Referring to the FIGURE, a consumable wire electrode 1 is fed by two feeding units 2, 3 from a bobbin 4 to a welding torch 5. The feeding units are mounted on a frame 6. Each feeding unit comprises a pair of rolls 2a, 2b and 3a, 3b, respectively. The rolls 2b and 3b are idler rolls which by means of springs (not shown) are pressed against the electrode 1 inserted between the rolls 2a, 2b and 3a, 3b. Each of the rolls 2a, 3a is driven directly or, if necessary, by means of gears by a separately excited direct current motor 7, 8, the armature windings of which are connected in series, and by leads 9, 10 to a supply voltage. Each motor is provided with a field winding 11, 12 in series with an adjustable field resistor 13, 14. The field circuits are connected in parallel to a d.c. supply voltage.

The two motors are of the same type and have a similar speed characteristic, which is slightly drooping from no-load to full load. Direct motors of this kind are particularly suitable as driving motors for these feeding devices.

A change-over switch 15 is interconnected in the lead 9. The switch 15 is operated by a contactor device 16. In the switch position shown in the FIGURE, the motors are connected to the supply voltage. In the other position, the motors are connected to a braking circuit including a resistor 17 having a constant resistance, and an adjustable resistor 18. In the latter position of the change-over switch 15, the two motors will be subjected to a rheostatic braking action. The braking time can be adjusted by means of the resistor 18.

The armature voltages of the two motors 7, 8 are monitored by a comparator 19 arranged to generate a signal as soon as any of the armature voltages deviates by more than a predetermined amount from a predetermined voltage value supplied to the comparator by an adjustable potentiometer 20. Said signal controls the contactor device 16, which on reception of the signal causes the change-over switch 15 to connect the armatures of the motors 7, 8 to the braking circuit, whereby the motors are rapidly brought to a standstill.

Abnormal conditions occuring during the feeding operation will cause the armature voltages to differ considerably from the predetermined value. For example, this will be the case when the electrode slides in one pair of rolls or when the electrode breaks between the feeding units. In such cases, the monitoring device described will serve to stop the motors immediately, so that no serious trouble can develop. During the pulling-in operation, that is, when a fresh electrode is withdrawn from the bobbin 4 and inserted between the rolls 2a, 2b and 3a, 3b, the armature voltage of the motor 7 differs considerably from the armature voltage of the motor 8 as long as the inserted electrode is advanced only by the motor 7. To prevent the comparator 19 from causing an automatic disconnection of the motors from the supply voltage during the pulling-in operation, the comparator is provided with a manually actuable blocking circuit by means of which the comparator can be rendered inactive.

The contactor device 16 can also be controlled by a timer 21 causing the contactor device to operate the change-over switch 15 periodically according to a program determined by the timer. The resulting step-bystep advancement of the electrode is preferably used for spot welding jobs. The timer 21 includes a blocking circuit controlled by the output signal of the comparator signal and serving to put the timer out of action on reception of said signal. Thus, the comparator signal will always cause the contactor device 16 to shift the change-over switch into its braking position.

During the feeding of the electrode the total pulling force exerted on the electrode will be distributed between the two roll pairs in such a way that the circumferential speeds of the rolls are equal. The torque of each motor is determined by the field current and the armature current. The feeding speed of the electrode is controlled by adjusting the supply voltage for the two armatures connected in series and/or by adjusting the field current.

Direct current motors provided with permanent magnets can also be used as driving motors. These motors are particularly simple but are generally not provided with any device for adjusting the magnetic flow.

We claim:

1. A device for feeding a consumable wire electrode comprising:
two feeding units for feeding a wire electrode arranged in tandem, each of the feeding units including a pair of rolls for feeding a wire electrode therebetween and a direct current motor having an armature for driving one of the rolls of the pair, and means for connecting the armatures of said motors in series with each other to a supply voltage.

2. The device for feeding a consumable wire electrode according to claim 1, wherein said direct current motors have a speed characteristic drooping not more than 20% between no-load and full load.

3. The device for feeding a consumable wire electrode according to claim 2, wherein said direct current motors have a speed characteristic drooping not more than 5% between no-load and full load.

4. A device for feeding a consumable wire electrode comprising, two feeding units for feeding a wire electrode arranged in tandem, each of the feeding units including a pair of rolls and a direct current motor having an armature for driving one of the rolls of the pair, means for connecting the armatures of said motors in series with each other to a supply voltage, means for comparing the armature voltage of each of the two motors with a predetermined voltage, said comparing means being arranged to generate a signal when the deviation of the armature voltage of any motor from the predetermined voltage is greater than a given value, a switch in the armature circuit of the motors, and means controlled by said signal for causing said switch to disconnect the armature circuit from the supply voltage.

5. The device for feeding a consumable wire electrode according to claim 4, in which said switch is a change-over switch arranged in one position to connect the motor armatures to the supply voltage and in the other position to connect the motor armatures in a braking circuit including a brake resistor.

6. The device for feeding a consumable wire electrode according to claim 5, including a timer for causing said change-over switch alternately to connect the armatures to the supply voltage and to the braking circuit.

7. The device for feeding a consumable wire electrode according to claim 6, which includes means controlled by said signal for rendering said timer inoperative.

* * * * *